United States Patent
Pattaswamy et al.

(10) Patent No.: US 8,526,946 B2
(45) Date of Patent: Sep. 3, 2013

(54) PERIODIC REGISTRATION UPDATES FOR MULTIPLE SIM USER EQUIPMENT

(75) Inventors: Giridhar Pattaswamy, Karnataka (IN); Navin K. Karra, Bracknell (GB); Abhishek Pandit, Wokingham (GB); Stephen J Richards, Maidenhead (GB); Yuan Liu, Holmdel, NJ (US); Yaxin Cao, Laurence Harbor, NJ (US); Jun Lin, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/545,515

(22) Filed: Jul. 10, 2012

(65) Prior Publication Data

US 2013/0150036 A1 Jun. 13, 2013

Related U.S. Application Data

(60) Provisional application No. 61/659,713, filed on Jun. 14, 2012, provisional application No. 61/569,621, filed on Dec. 12, 2011, provisional application No. 61/587,521, filed on Jan. 17, 2012, provisional application No. 61/595,546, filed on Feb. 6, 2012.

(51) Int. Cl.
*H04W 4/00* (2009.01)
(52) U.S. Cl.
USPC .................................................... 455/435.1
(58) Field of Classification Search
USPC .......................................... 455/435.1
See application file for complete search history.

(56) References Cited

U.S. PATENT DOCUMENTS

| | | | |
|---|---|---|---|
| 2002/0006808 A1* | 1/2002 | Onaka et al. | 455/550 |
| 2009/0131054 A1 | 5/2009 | Zhang | |
| 2009/0156257 A1 | 6/2009 | Shi | |
| 2009/0215473 A1 | 8/2009 | Hsu | |
| 2009/0312020 A1 | 12/2009 | Lee | |

FOREIGN PATENT DOCUMENTS

| | | | |
|---|---|---|---|
| EP | 2352353 A1 | 7/2010 | |
| WO | WO 2010/140781 A2 | 12/2010 | |

OTHER PUBLICATIONS

European Search Report, EP App. No. 12008036.1, dated Apr. 25, 2013, 5 pages.
European Search Report, EP App. No. 12008038.7, dated Apr. 5, 2013, 3 pages.

* cited by examiner

*Primary Examiner* — Temica M Beamer
*Assistant Examiner* — Joel Ajayi
(74) *Attorney, Agent, or Firm* — Brinks Hofer Gilson & Lione

(57) ABSTRACT

Systems and methods are presented to support operation of a multiple subscriber identity module (SIM) device. A first SIM may perform a data transfer or voice call. During the first SIM's data transfer or voice call, transition times are identified to transition communication resources to a second SIM for use in performing a registration update communication with a network controller that supports the second SIM. The registration update communication may include a periodic location update, a periodic routing update, or a periodic tracking update. The multiple SIM device may identify the transition time by obtaining periodic registration timing information from the network controller, configuring a periodic registration timer based on the periodic registration timing information, and setting the transition time as an expiration time of the periodic registration timer.

20 Claims, 16 Drawing Sheets

US 8,526,946 B2

PERIODIC REGISTRATION UPDATES FOR MULTIPLE SIM USER EQUIPMENT

CROSS REFERENCE TO RELATED APPLICATIONS

This application claims the benefit of priority to the following U.S. provisional patent applications:
U.S. Patent Application No. 61/659,713, filed 14 Jun. 2012;
U.S. Patent Application No. 61/569,621, filed 12 Dec. 2011;
U.S. Patent Application No. 61/587,521, filed 17 Jan. 2012; and
U.S. Patent Application No. 61/595,546, filed 6 Feb. 2012.

TECHNICAL FIELD

This disclosure relates to communication devices with multiple Subscriber Identity Modules (SIMs). This disclosure also relates to resource scheduling in communication devices with multiple SIMs.

BACKGROUND

Rapid advances in electronics and communication technologies, driven by immense customer demand, have resulted in the widespread adoption of mobile communication devices. The extent of the proliferation of such devices is readily apparent in view of some estimates that put the number of wireless subscriber connections in use around the world at nearly 80% of the world's population. Furthermore, other estimates indicate that (as just three examples) the United States, Italy, and the UK have more mobile phones in use in each country than there are people living in those countries.

Relatively recently, cellular phone manufactures have introduced phone designs that include multiple SIM cards. Each SIM card facilitates a separate connection to the same network or different networks. As a result, the SIMs provide the owner of the phone with, for example, two different phone numbers handled by the same phone hardware. Accordingly, the multiple SIM approach alleviates, to some degree, the need to carry different physical phones. Improvements in multiple SIM communication devices will continue to make such devices attractive options for the consumer.

BRIEF DESCRIPTION OF THE DRAWINGS

The innovation may be better understood with reference to the following drawings and description. In the figures, like reference numerals designate corresponding parts throughout the different views.

DETAILED DESCRIPTION

The discussion below makes reference to user equipment. User equipment may take many different forms and have many different functions. As one example, user equipment may be a cellular phone capable of making and receiving wireless phone calls. The user equipment may also be a smartphone that, in addition to making and receiving phone calls, runs general purpose applications. User equipment may be virtually any device that wirelessly connects to a network, including as additional examples a driver assistance module in a vehicle, an emergency transponder, a pager, a satellite television receiver, a networked stereo receiver, a computer system, music player, or virtually any other device. The discussion below addresses how to manage paging reception in user equipment that includes multiple (e.g., two) SIMs.

Figure 1:
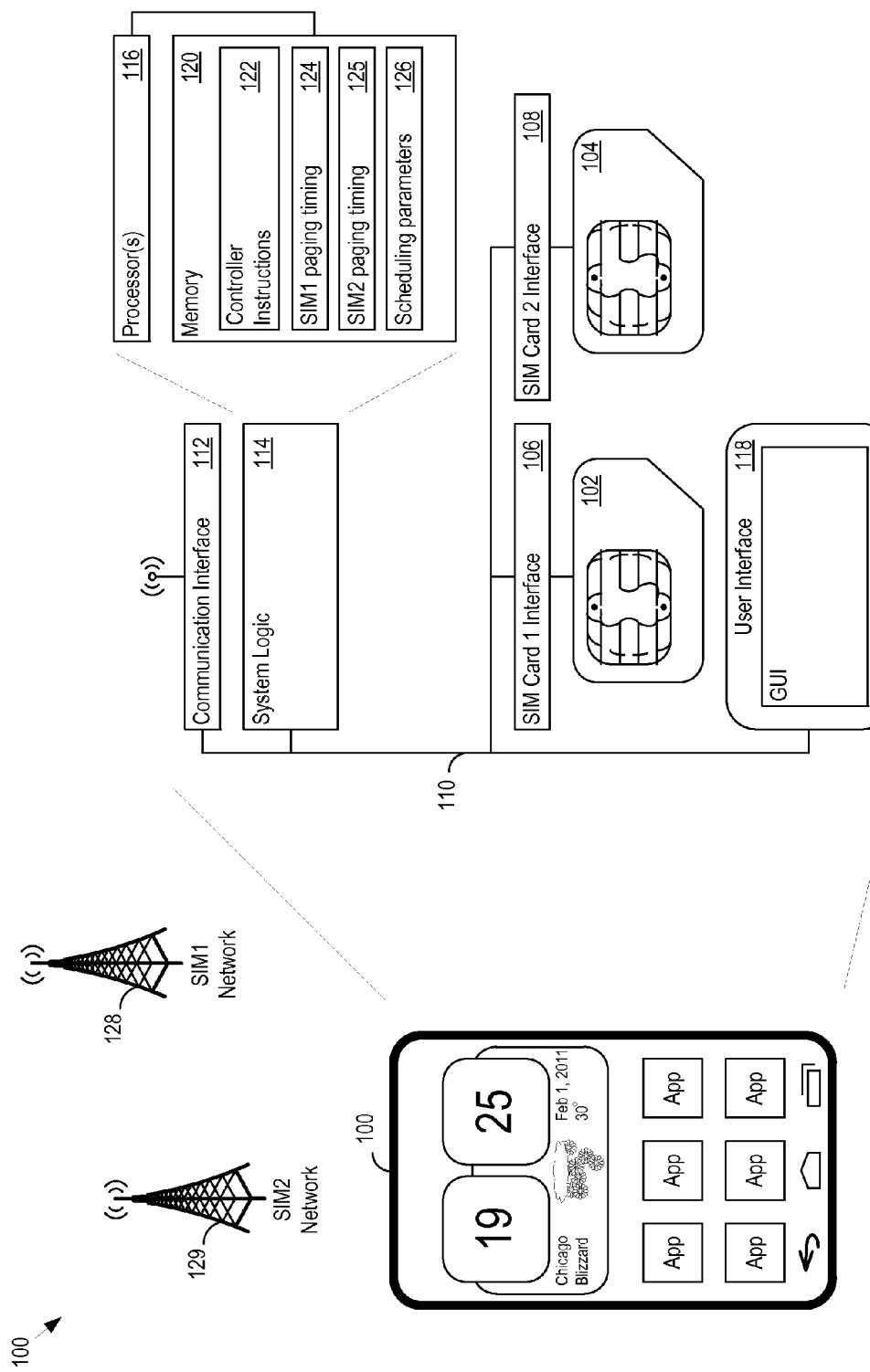
FIG. 1 shows an example of user equipment with multiple SIMs.

FIG. 1 shows an example of user equipment 100 with multiple SIMs, in this example the SIM1 102 and the SIM2 104. An electrical and physical interface 106 connects SIM1 102 to the rest of the user equipment hardware, for example, to the system bus 110. Similarly, the electrical and physical interface 108 connects the SIM2 to the system bus 110.

The user equipment 100 includes a communication interface 112, system logic 114, and a user interface 118. The system logic 114 may include any combination of hardware, software, firmware, or other logic. The system logic 114 may be implemented, for example, in a system on a chip (SoC), application specific integrated circuit (ASIC), or other circuitry. The system logic 114 is part of the implementation of any desired functionality in the user equipment. In that regard, the system logic 114 may include logic that facilitates, as examples, running applications, accepting user inputs, saving and retrieving application data, establishing, maintaining, and terminating cellular phone calls, wireless network connections, Bluetooth connections, or other connections, and displaying relevant information on the user interface 118. The user interface 118 may include a graphical user interface, touch sensitive display, voice or facial recognition inputs, buttons, switches, and other user interface elements.

The communication interface 112 may include one or more transceivers. The transceivers may be wireless transceivers that include modulation/demodulation circuitry, amplifiers, analog to digital and digital to analog converters and/or other logic for transmitting and receiving through one or more antennas, or through a physical (e.g., wireline) medium. As one implementation example, the communication interface 112 and system logic 114 may include a BCM2091 EDGE/HSPA Multi-Mode, Multi-Band Cellular Transceiver and a BCM59056 advanced power management unit (PMU), controlled by a BCM28150 HSPA+ system-on-a-chip (SoC) baseband smartphone processor. These integrated circuits, as well as other hardware and software implementation options for the user equipment 100, are available from Broadcom Corporation of Irvine Calif. The transmitted and received signals may adhere to any of a diverse array of formats, protocols, modulations, frequency channels, bit rates, and encodings that presently or in the future support communications including paging notifications associated with SIMs. As one specific example, the communication interface 112 may support transmission and reception under the Universal Mobile Telecommunications System (UMTS). The techniques described below, however, are applicable to other communications technologies that include paging whether arising from the 3rd Generation Partnership Project (3GPP), GSM® Association, Long Term Evolution (LTE)™ efforts, or other partnerships or standards bodies.

In one implementation, the system logic 114 includes one or more processors 116 and a memory 120. The memory 120 stores, for example, controller instructions 122 that the processor 116 executes. As will be described in more detail below, the controller instructions 122 facilitate transitioning communication resources, such as the communication interface 112, between multiple SIMs for background paging monitoring or periodic registration updates.

SIM1 102 and SIM2 104 may be on the same or different networks, and may be served by the same or different cells. For example, the network controller A 128 may manage a particular cell to which SIM1 102 is connected, while the network controller B 129 may manage a different cell to which SIM2 104 is connected.

Both SIM1 102 and SIM2 104 may share access to the communication interface 112. For example, there may be one set of transceiver circuitry that both SIM1 102 and SIM2 104 share in time division manner. As a result, the system logic 114 may decide which SIM is given use of the communication interface 112, as SIM1 102 and SIM2 104 cannot both be active on the communication interface 112 at the same time.

This application makes reference to a virtual modem. A virtual modem may refer to a software implementation of physical resources of the user equipment 100, for example through hardware virtualization. As described above with respect to the communication interface 112, the user equipment 100 may include one or more sets of physical baseband or RF resources, such as coders/decoders, modulators, amplifiers, and antennas. A virtual modem may represent a software virtualization of any of the resources in the RF path in the communication interface 112. Accordingly, each SIM of the user equipment 100 may be assigned a virtual modem, and thus recognize and use the virtualized communication resources of the virtual modem to communicate across a network, without the need to understand or deal with the complexities that may arise from sharing RF path hardware between multiple SIMs. A separate virtual modem may be instantiated and assigned to each SIM to communicate across the respective network that a respective SIM is connected to. Said another way, multiple virtual modems may share a common set of physical communication resources of the user equipment 100, with the virtual modems managed and controlled by virtual modem logic, such as a virtual machine controller, which may be implemented in hardware, software, or both. The virtual modem logic, as one example, may schedule or otherwise manage access to the RF path hardware for each SIM, as well as respond to requests made by the virtual modems for access to the RF path resources for their particular SIM.

Figure 2:
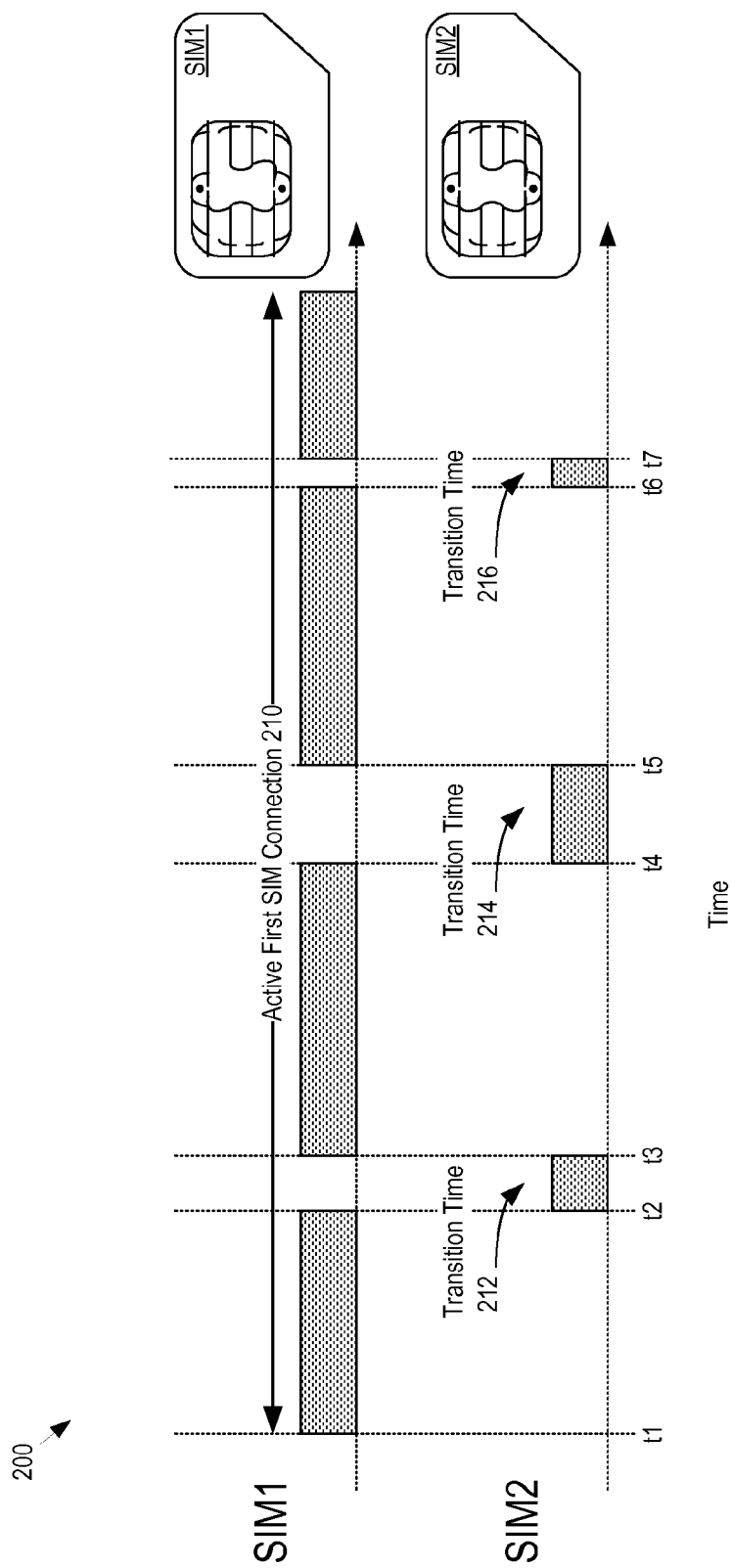
FIG. 2 shows a timing example of background paging monitoring.

FIG. 2 shows a timing example 200 of background paging monitoring. The timing example 200 depicts how the system logic 114 may coordinate sharing the communication interface 112 among multiple SIMs, such as SIM1 102 and SIM2 104. FIG. 2 depicts, using the shaded sections, sharing of the communication interface 112 along the respective timelines for SIM1 and SIM2. As illustrated in FIG. 2, the system logic 114 has scheduled an active period 210 for SIM1 on the communication interface 112. For the reasons explained below, however, the system logic 114 connects SIM1 102 to the communication interface 112 during times t1 to t2, t3 to t4, t5 to t6, and after t7, while allocating slices of time out of the SIM1 active period 210 in order to allow SIM2 104 to connect to the communication interface 112, in this example during times t2 to t3, t4 to t5, and t6 to t7.

In other words, the system logic 114 schedules and coordinates SIM1 102 and SIM2 104 data communication during the active first SIM connection 210. For example, SIM1 102 may establish a circuit switched (CS) connection during the active first SIM connection 210, such as a voice call connection. SIM1 102 may alternatively establish a packet switched (PS) connection during the active first SIM connection 210, for example to perform data packet transfers.

While SIM1 102 is active on the communication interface 112 (e.g., during a PS or CS call), SIM2 104 may be unable to transmit or receive data. As a result, SIM2 104 may be unable to monitor a paging channel or receive paging indicators. As a result, SIM2 104 may not receive a paging indicator meant to notify SIM2 104 of an incoming voice call while SIM1 102 is active on the communication interface 112. To allow SIM2 to monitor paging information, the system logic 114 may identify a paging transition time during the active first SIM connection 210. The paging transition time may indicate when to transition the communication interface 112 to SIM2 104 for any reason, such as to monitor for paging messages, including paging indicators. In the timing example 200, the user system logic 114 has identified a first paging transition time 212 at time t2, a second paging transition time 214 at time t4, and a third paging transition time 216 at time t6. At the paging transition times 212-216, the system logic 114 will transition the communication interface 112 from SIM1 102 to SIM2 104. As a result, and as shown in the timing example 200, SIM2 104 may then be active on the communication interface 112 from times t2 to t3, t4 to t5, and t6 to t7, despite the fact that these time windows are within the originally scheduled SIM1 active period 210.

During a transition time, e.g., the transition times 212-216, SIM2 104 may attempt to receive a paging indicator, for example by monitoring a paging indicator channel. The system logic 114 may return the communication interface 112 to SIM1 102 to continue the active first SIM connection 210 after SIM2 104 attempts to receive a paging indicator. When SIM2 104 receives a paging indicator indicating an incoming connection for SIM2 104, the system logic 114 may continue to grant access on the communication interface 112 for SIM2 104 to handle a selected aspect of the incoming connection instead of returning the communication interface 112 to SIM1 102.

The system logic 114 (e.g., implemented with the controller instructions 122), may determine a paging transition time during the active first SIM connection 210 in a variety of ways. As one example, the user equipment 100 may store SIM1 paging timing information 124 and SIM2 paging timing information 125 that identifies when a paging indicator will be transmitted from a network controller to the user equipment 100. Thus, the system logic 114 may identify paging transition times to transition the communication interface 112 to SIM2 104 based on the SIM2 paging timing information 125. The system logic 114 may identify additional transition times to transition the communication interface 112 to SIM2 104 during the active first SIM connection 210, as described below.

The system logic 114 may also determine a paging transition duration indicating how long the communication interface 112 is transitioned to SIM2. Thus, the system logic 114 may transfer the communication interface 112 to SIM2 at a paging transition time for a duration given by the paging transition duration. As seen in FIG. 2, the paging transition duration at the first paging transition time 212 is the time from t2 to t3. Similarly, the paging transition duration at the second paging transition time 214 is the time from t4 to t5. The paging transition duration may be a predetermined time value that applies to one or more instances when the system logic 114 transitions the communication interface 112 to SIM2 104 for background paging monitoring. The paging transition durations may be the same or different from transition to transition. The number and durations of the paging transitions may be chosen to meet an impact criteria. The impact criteria may be, for example, that there is less than a specific amount of interruption to the SIM1 activities, such as less than a predetermined percentage (e.g., 10%) of the SIM1 active time 210 is allocated to another SIM, that there is less than a predetermined percentage (e.g., 15%) of bandwidth reduction for SIM1, or other criteria. The network controllers may signal the impact criteria to the user equipment 100 in a control channel, for example. Alternatively or additionally, the user interface 118 may accept impact criteria chosen by the user.

As one specific example, the system logic 114 may set the length of the paging transition duration to be long enough for SIM2 104 to monitor a paging channel and receive a paging indicator, for example 20 ms. Or, the system logic 114 may set the paging transition duration to be at least a minimum time for SIM2 104 to receive a page. The paging transition duration be variable, and may vary depending on paging signal strength, page content, or any other factors. As the time to receive a page or monitor a paging channel is relatively short, the impact on the SIM1 PS or CS call may be low. In this way, the system logic 114 creates gaps during the active first SIM connection 210 to allow SIM2 104 to monitor paging information. The memory 126 may store scheduling 126 parameters that may include paging transition times, paging transition durations, and active periods for SIM1 102 and SIM2 104.

Figure 3:
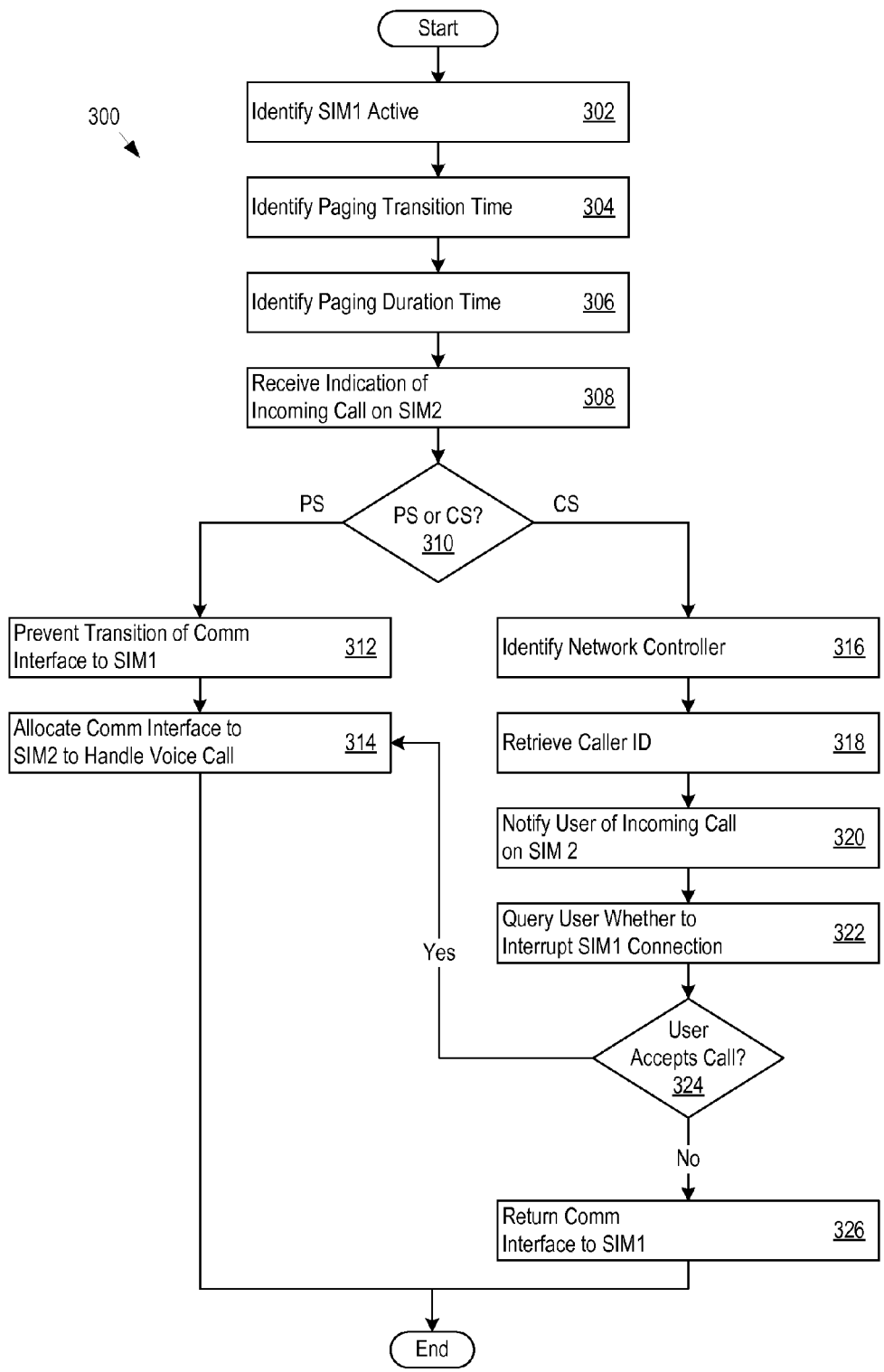
FIG. 3 shows an example of controller logic that the system logic may implement in hardware, software, or both.

FIG. 3 shows an example of controller logic 300 that the system logic 114 may implement in hardware, software, or both. For example, the controller logic 300 may be implemented in software as the controller instructions 122. The controller logic 300 may identify that SIM1 102 is active on the communication interface 112 (302), for example during an active first SIM connection 210. During this time, SIM2 104 may be in a suspended mode (e.g., camped on a cell and not active on the communication interface 112). The controller logic 300 may then identify a paging transition time to transition the communication interface 112 to SIM2 104 to monitor a paging channel (304). The controller logic 300 may also identify a paging transition duration specifying the amount of time the communication interface 112 may be transitioned to SIM2 104 (306).

During the active first SIM connection 210, SIM2 may receive a paging indicator that indicates whether an incoming voice call is directed to SIM2. The controller logic 300 may receive an indication from SIM2 of the incoming voice call (308). Then, the controller logic 300 may determine if the active first SIM connection 210 is a voice call connection or a data packet connection (310). Phrased alternatively, the controller logic 300 may determine whether SIM1 is active on the communication interface 112 performing a PS call or a CS call.

If SIM1 is performing a PS call when the incoming voice call to SIM2 arrives, the controller logic 300 may interrupt the active first SIM connection 210, thus interrupting the SIM1 PS call. To that end, the controller logic 300 may prevent transitioning the communication interface 112 back to SIM1 at the end of the paging transition duration (312), instead allocating the communication interface 112 to SIM2 104 to handle the incoming voice call (314).

If SIM1 is performing a CS call when the incoming voice call to SIM2 arrives, the controller logic 300 may establish a connection with the network in order to retrieve caller identification (caller ID) information associated with the incoming voice call. In one implementation, the controller logic 300 may identify additional transition times to retrieve the caller ID information of the incoming voice call and transition the communication interface 112 to SIM1 102 until the identified transition times. Alternatively, the controller logic 300 may retrieve the caller ID information before returning the communication interface 112 to SIM1 102.

To establish a connection with the network, the controller logic 300 may identify a network controller with which to establish a network connection and to retrieve caller ID information (316). The process of obtaining the caller ID information may follow any established sequence of signaling specified by any particular communication standard. For example, the controller logic 300 may transmit a radio resource connection (RRC) connection request message to a network controller (e.g., network controller B 129). The controller logic 300 may next receive a RRC connection setup message, which may include channel assignments. The controller logic 300 may also communicate with the network controller to transmit a RRC connection setup complete message, transmit an initial direct transfer message, and receive a measurement control message. Moreover, the controller logic 300 may exchange security mode command messages and radio bearer setup messages between SIM2 104 and the network controller. Once the radio bearer setup is complete, the controller logic 300 may then retrieve the caller ID information of the incoming voice call by receiving a call alerting message from the network controller. The controller logic 300 may identify times when the network controller may transmit or receive communications with SIM2, for example to assign the downlink channel.

Once the caller ID has been retrieved (318), the controller logic 300 may notify a user of the incoming voice call on SIM2 (320), allowing the user to decide whether to interrupt the active first SIM connection 210 (322). For example, the controller logic 300 may issue a query to the user interface 110 whether to accept or reject the incoming voice call. When the call is accepted, e.g., if the user accepts the incoming voice call on SIM2 (324) through the user interface 110, the controller logic 300 may interrupt the active first SIM connection 210 and transition the communication interface 112 to SIM2 104 to handle the incoming voice call (314). When the call is rejected, e.g., if the user rejects the incoming voice call on SIM2 through the user interface 110, the controller 700 may return the communication interface 112 to SIM1 102 (326) to continue the active first SIM connection 210. The system logic 114 may determine whether to accept or reject the incoming call in other ways. For example, the system logic 114 may read a decision parameter from the memory 120. As one example, the decision parameter may indicate that all incoming calls should be rejected or accepted. As another example, the decision parameter may indicate that incoming calls matching certain caller IDs should be rejected or accepted.

Figure 4:
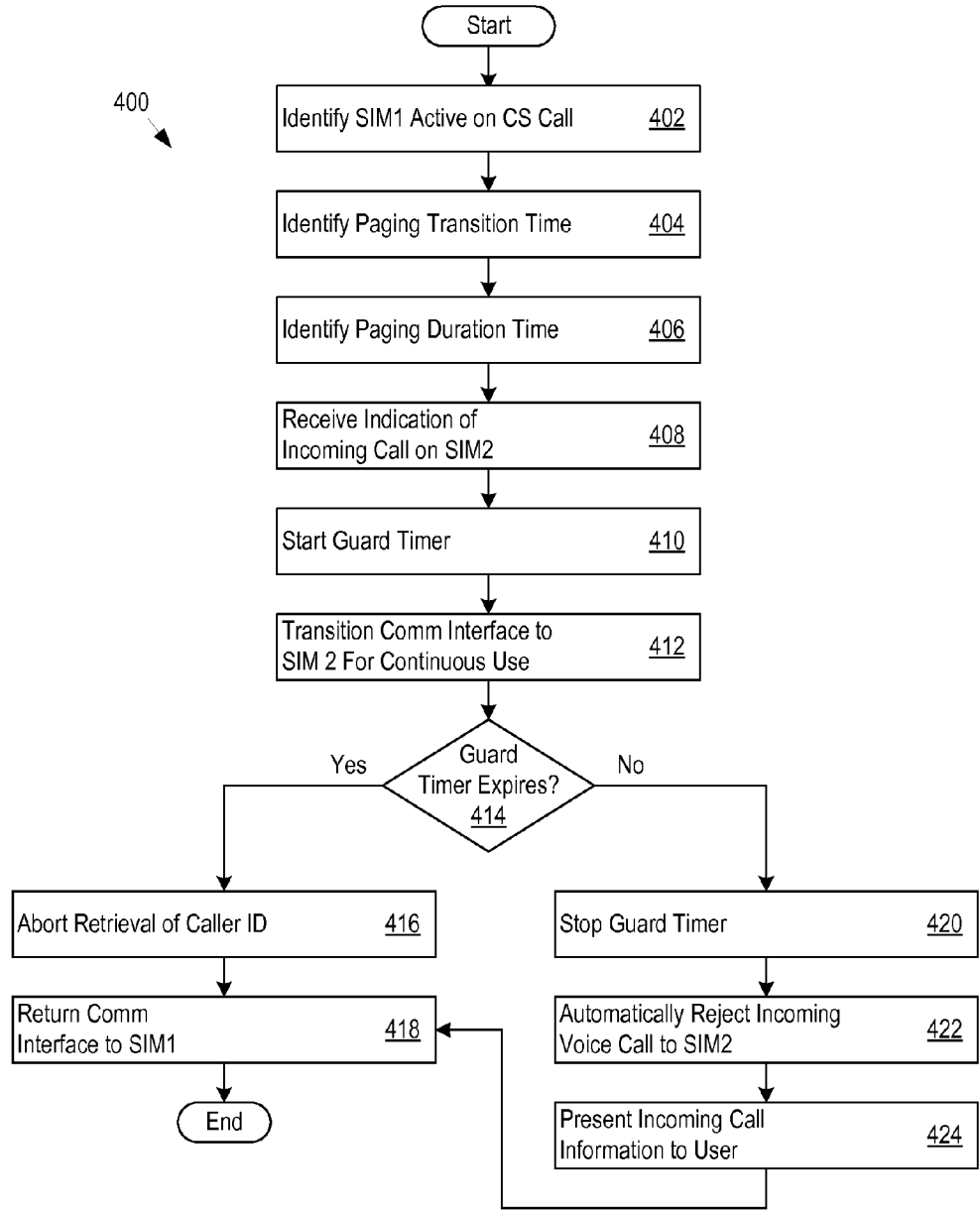
FIG. 4 shows an example of controller logic that the system logic may implement in hardware, software, or both.

FIG. 4 shows an example of controller logic 400 that the system logic 114 may implement in hardware, software, or both. For example, the controller logic 400 may be implemented in software as the controller instructions 122. The controller logic 400 may identify that SIM1 102 is active on the communication interface 112 performing a CS call (e.g., a voice call) (402). Similar to the controller logic 300, the controller logic 400 may identify a paging transition time (404) to transition the communication interface 112 to SIM2 104 to monitor a paging channel and a paging transition duration (406).

During the active first SIM connection 210 when SIM1 is performing a CS call, SIM2 may receive and decode a paging indicator indicating an incoming voice call directed to SIM2. The controller logic 400 may receive an indication from SIM2 of the incoming voice call (408). In response, the controller logic 400 may first start a guard timer (410) to limit the amount of time the communication interface 112 is transitioned to SIM2, as described below. As one example, the guard timer may be set to a length of time such even though the communication interface is assigned to SIM2 104, a network to which SIM1 102 is connected will not drop (or would not be expected to drop) the active first SIM connection 210 upon expiration of the guard timer. The length of the guard timer may be, for example, 5 to 15 seconds depending on the network configuration. The length of the guard timer may also be shorter so as to reduce the impact on the SIM1 CS call.

The controller logic 400 may also prevent transitioning the communication interface 112 back to SIM1 when a paging transition duration expires. Instead, the controller logic 400 may transition the communication interface 1120 to SIM2 for continued use in order to retrieve caller ID information for the incoming voice call (412). In other words, the controller logic 400 may interrupt the active first SIM connection 210 for an amount of time required to allow SIM2 to establish a connection with the network and retrieve the caller ID information of the incoming voice call. As an example, the active first SIM connection 210 and the SIM1 102 CS call may be interrupted for some time (e.g., 2 to 4 seconds) while SIM2 104 retrieves the caller ID information, during which audio for a SIM1 102 voice call may be suspended.

If the guard timer expires before SIM2 104 retrieves the caller ID information (414), the controller logic 400 may abort the attempt by SIM2 104 to retrieve the caller ID (416). The controller logic 400 may abort the attempt, for example, by suspending the virtual machine controlling the SIM, or instructing the virtual machine to release so that access to the communication interface 112 ends and communications cease. For example, the controller logic 400 may suspend a virtual machine controlling the SIM or instruct the virtual machine to release so that the SIM's access to the communication interface 112 ends and communications cease. The controller logic 400 may then return the communication interface 112 back to SIM1 to resume the active first SIM connection 210 (418).

If SIM2 104 establishes a connection with the network and retrieves the caller ID information before the guard timer expires, the controller logic 400 may stop the guard timer (420). The controller logic 400 may then automatically reject the incoming voice call to SIM2 104 (422) by, for example, ceasing communications with the network controller. The controller logic 400 may then present incoming call information to the user, such as through the user interface 118 (424). The incoming call information may include the time when the incoming voice call was received by the user equipment 100, an indication the incoming voice call was directed to SIM2 104, or the retrieved caller ID information of the incoming voice call. The controller logic 400 may also return the communication interface 112 back to SIM1 to resume the active first SIM connection 210 (418).

Figure 5:
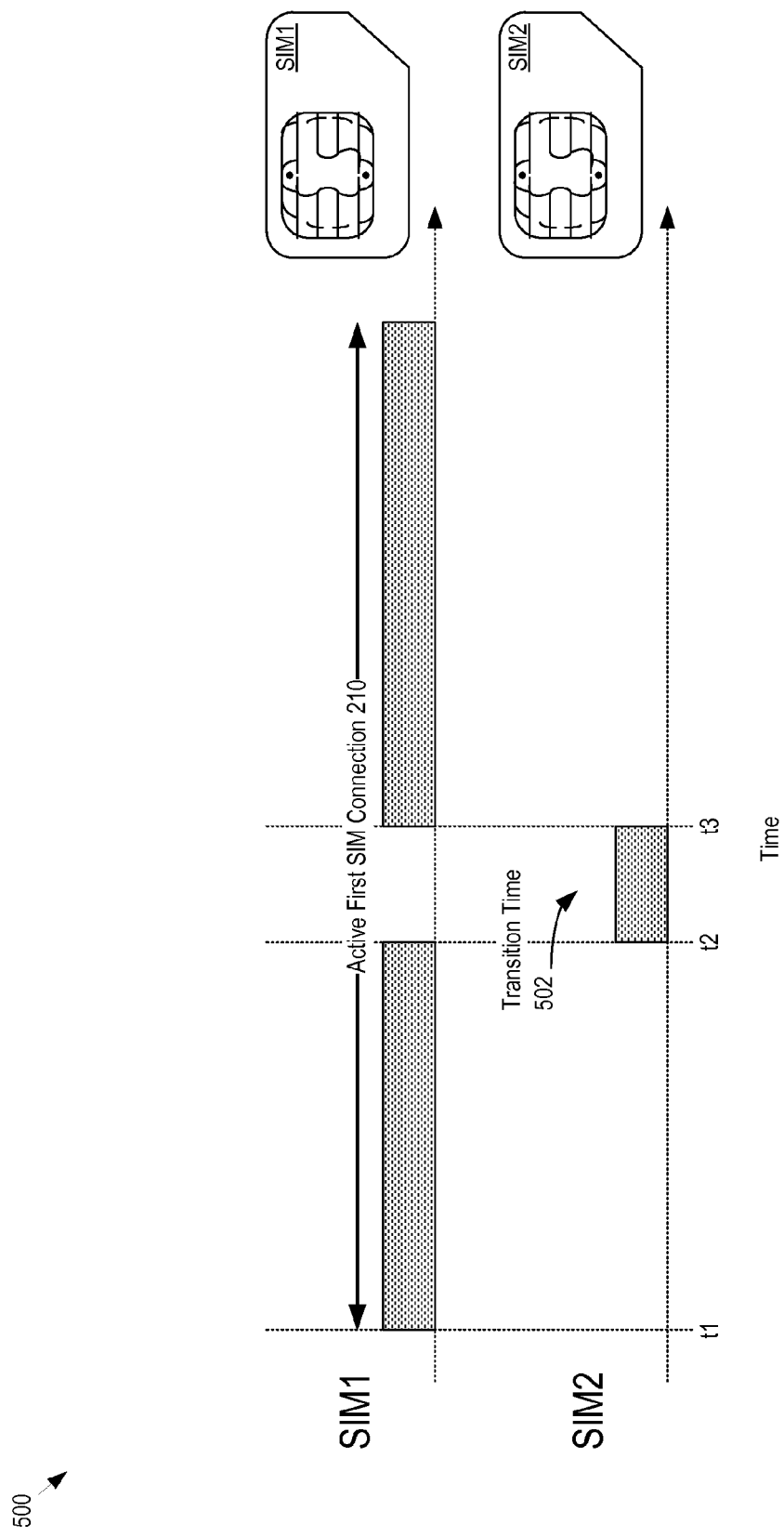
FIG. 5 shows a timing example 500 of a periodic registration update.

FIG. 5 shows a timing example 500 of a periodic registration update. Even when suspended, SIM2 104 may monitor paging indicators from a network as described in FIGS. 2-4 above. In order to maintain a connection with the network, SIM2 104 may perform a periodic registration update with the network, for example by sending a network registration communication to a network controller supporting SIM2 104, e.g., network controller B 129. Performing the periodic registration update may include any combination of performing a periodic location update, a periodic routing area update, or a periodic tracking area update.

The network may specify periodic registration timing information that specifies the periodicity which the user equipment 100 or the system logic 114 may perform a periodic registration update in order for a SIM (e.g., SIM2 104) to maintain a connection with the network. The periodic registration timing information may include timing information relating to performing a periodic location update, a periodic routing area update, or a periodic tracking area update. The network may communicate the periodic registration timing information to the user equipment 100 and SIM2 104 through a network controller, such as network controller B 129. Thus, if SIM2 104 fails to transmit a periodic registration update to the network controller at a frequency specified by the network's periodic registration timing information, the network may drop the connection with SIM2 104. In such a case, SIM2 104 may be unable to successfully monitor an appropriate paging channel or receive a paging indicator.

When SIM1 102 is active on the communication interface 112 (e.g., performing a PS or CS call), SIM2 104 may be unable to perform a periodic registration update to a network controller to maintain a network connection. Accordingly, the system logic 114 may identify a transition time during the active first SIM connection 210 to transition the communication interface 112 to SIM2 to perform a selected communication, such as a registration update with a network supporting SIM2.

In the timing example 500, the system logic 114 has identified a time t2 as a transition time 402 to transition the communication interface 112 to SIM2 104 to perform a registration update with a network. The system logic 114 may selectively transition the communication interface 112 to SIM2 104 at the transition time. For example, the system logic 114 may determine a transition decision based on the type of connection of the first SIM connection 210, e.g., PS call or CS call. The transition decision may also involve whether the transitioning the communication interface 112 to SIM2 will maintain a certain quality level of the active first SIM connection 210, and may include any of the impact criteria discussed above. In the timing example 500 shown in FIG. 5, the system logic 114 may selectively transition the communication interface to SIM2 104 at the transition time 502. SIM2 104 may perform a periodic location update, a periodic routing area update, or a periodic tracking area update to maintain the network connection from time t2 to t3. Once SIM2 104 has completed the registration update, the system logic 114 may return the communication interface 112 to SIM1 to continue the active first SIM connection 210.

Figure 6:
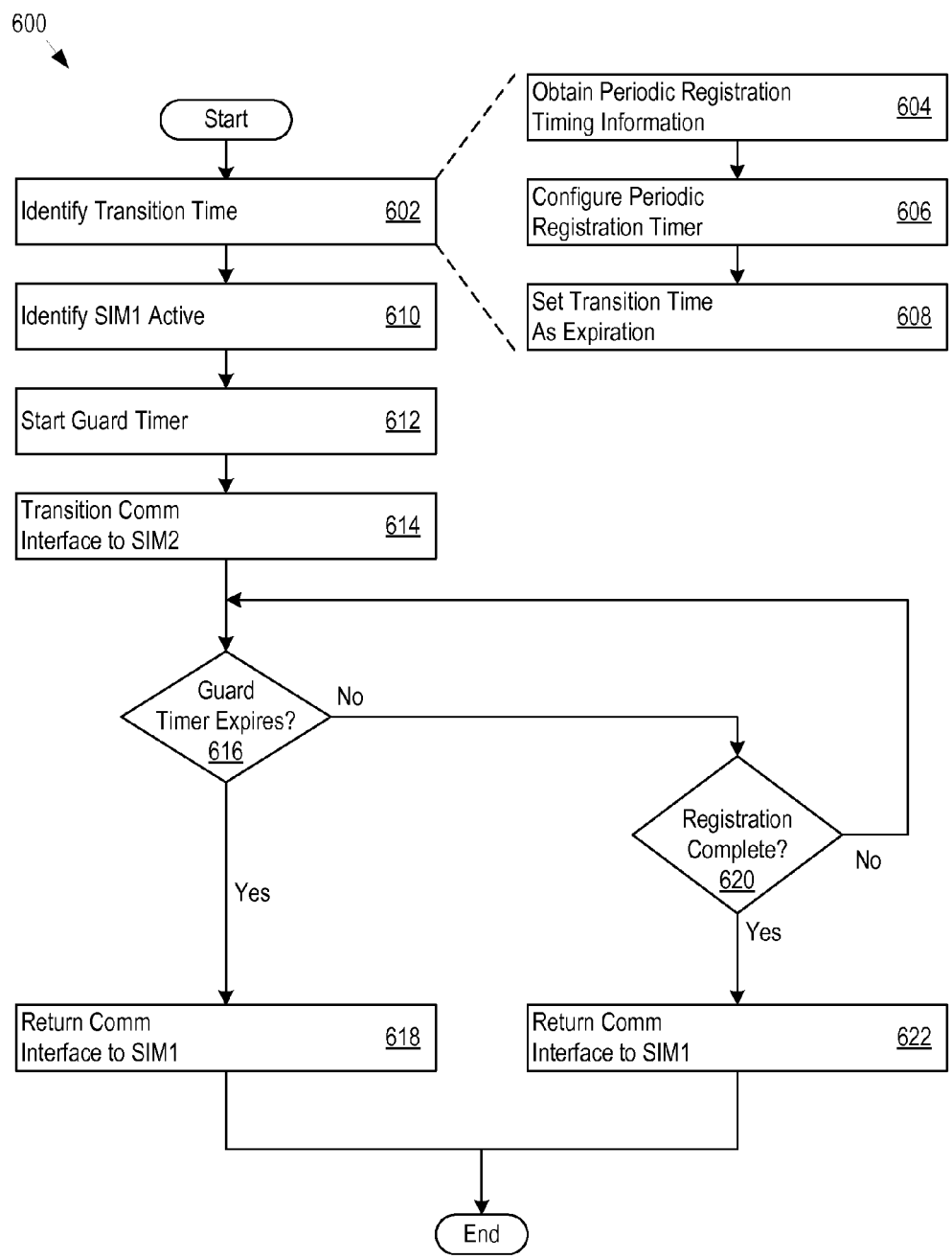
FIG. 6 shows an example of controller logic that the user equipment may implement in hardware, software, or both.

FIG. 6 shows an example of controller logic 600 that that the system logic 114 may implement in hardware, software, or both. As with the controller logic 300 and the controller logic 400, the controller logic 600 may be implemented in software as the controller instructions 122. The controller logic 600 may identify a transition time during the active first SIM connection 210 (602) to transition the communication interface 112 to SIM2 104 to perform a periodic registration update. For example, the controller logic 600 may obtain periodic registration timing information from a network controller (604). The periodic registration timing information of a network may be transmitted by the network controller when the system logic 114 or SIM2 104 successfully initiates a connection with the network. The controller logic 600 may configure a periodic registration timer based on the obtained received periodic registration timing information (606). As an example, the periodic registration timer may be configured to expire in sufficient time for SIM2 to perform the registration update to maintain the network connection, e.g., sending a periodic location update. The controller logic 600 may configure a similar periodic registration timer for performing a periodic routing area update or a periodic tracking area update, depending on the configuration of the network. The controller logic 600 may set the transition time as the expiration time of any of the configured periodic registration timers (608).

Alternatively, the periodic registration timing information may be processed and the periodic registration timer may be configured by logic associated with SIM2 104. In this implementation, the controller logic 600 may identify the transition time when a request is received from SIM2 to perform a periodic registration update.

When a periodic registration time expires, the controller logic 600 may identify that SIM1 is active on the communication interface 112 (610) and start a guard timer (612) to control the length of time the communication interface 112 is transitioned to SIM2 104. The controller logic 600 may then selectively transition the communication interface 112 to SIM2 104 to perform the periodic registration update (614). In one implementation, the controller logic 600 may selectively transition the communication interface 112 by not transitioning the communication interface 112 to SIM2 104 when SIM1 is performing a CS call (e.g. a voice call), instead prioritizing the SIM1 102 CS call over SIM2 104 maintaining a network connection through performing a periodic registration update. Alternatively, the controller logic 600 may transition the communication interface 112 to SIM2 104 regardless of whether SIM1 is performing a PS call or a CS call during the active first SIM connection 210.

The controller logic 600 may monitor whether the guard timer has expired (616). If the guard timer expires before SIM2 104 completes the periodic registration update, the controller logic 600 may return the communication interface 112 to SIM1 to resume the active first SIM connection 210 (618). When the guard timer has not expired, the controller logic 600 may determine if SIM2 has completed the periodic registration update (620). If SIM2 completes the periodic registration update before expiration of the guard timer, the controller logic 600 may return the communication interface 112 to SIM1 to resume the active first SIM connection 210 (622). If not, the controller logic 600 may continue to monitor whether the guard timer has expired (616).

Figure 7:
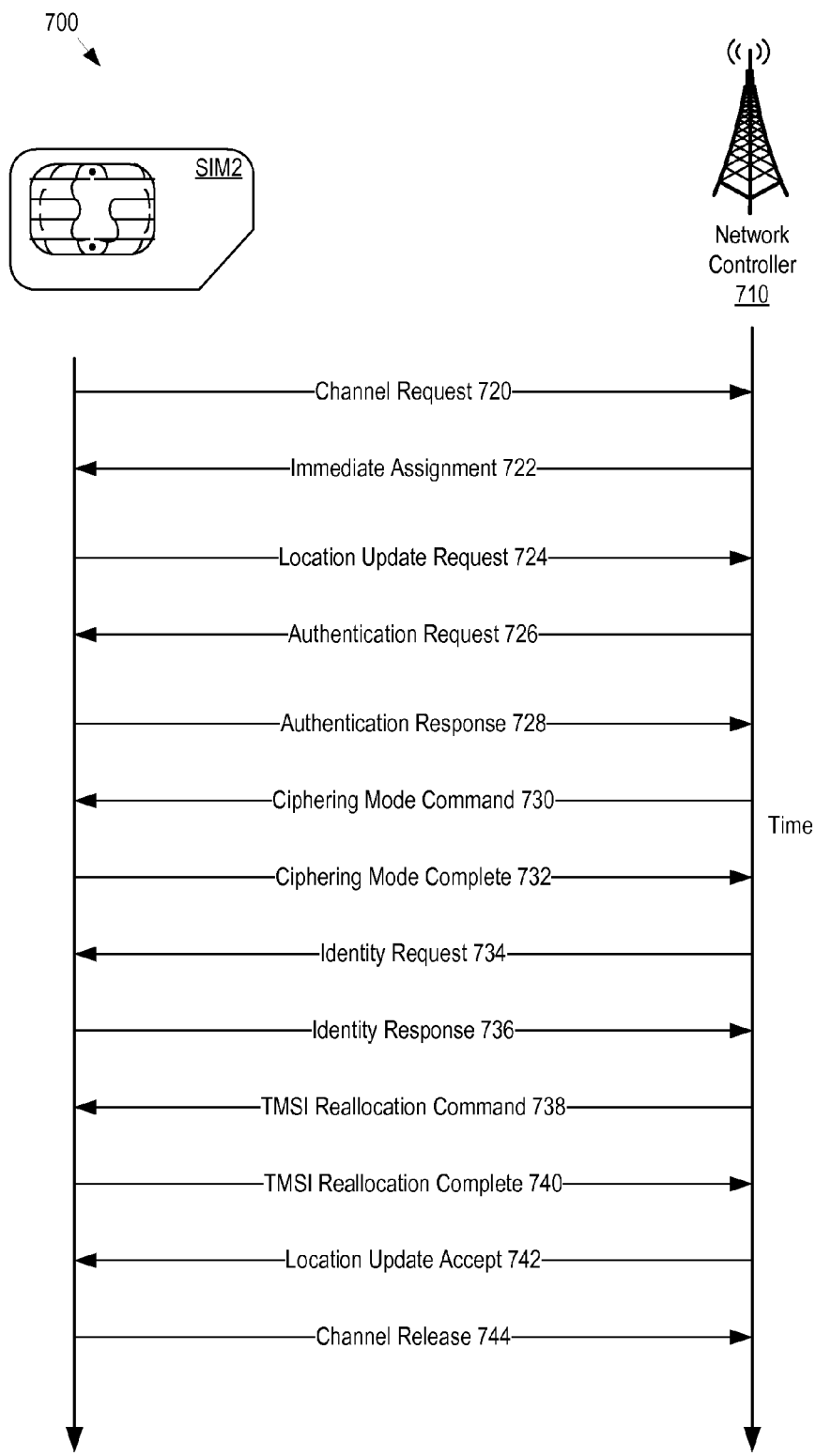
FIG. 7 shows an example of a periodic location update.

FIG. 7 shows an example of a periodic location update 700. A SIM such as SIM2 104 may perform the periodic location update 700 through a series of communications between the user equipment 100 (and specifically SIM2 104) and a network controller 710. To perform the periodic location update, SIM2 104 may transmit a channel request message 720 to the network controller 710 and the network controller 710 may respond with an immediate assignment message 722. Next, SIM2 104 may transmit a location update request message 724. The network controller 710 may then transmit an authentication request message 726 and SIM2 104 may transmit an authentication response 728. A similar exchange of messages between SIM2 104 and the network controller 710 may be performed relating to ciphering mode (e.g., 730 and 732), the identity of the user equipment 100 (e.g., 734 and 736), and temporary mobile subscriber identity (TMSI) (e.g., 738 and 740). The network controller 710 may then transmit a location update accept message 742. SIM2 104 may respond by transmitting a channel release message 744 to the network controller 710, which may complete the periodic location update.

Figure 8:
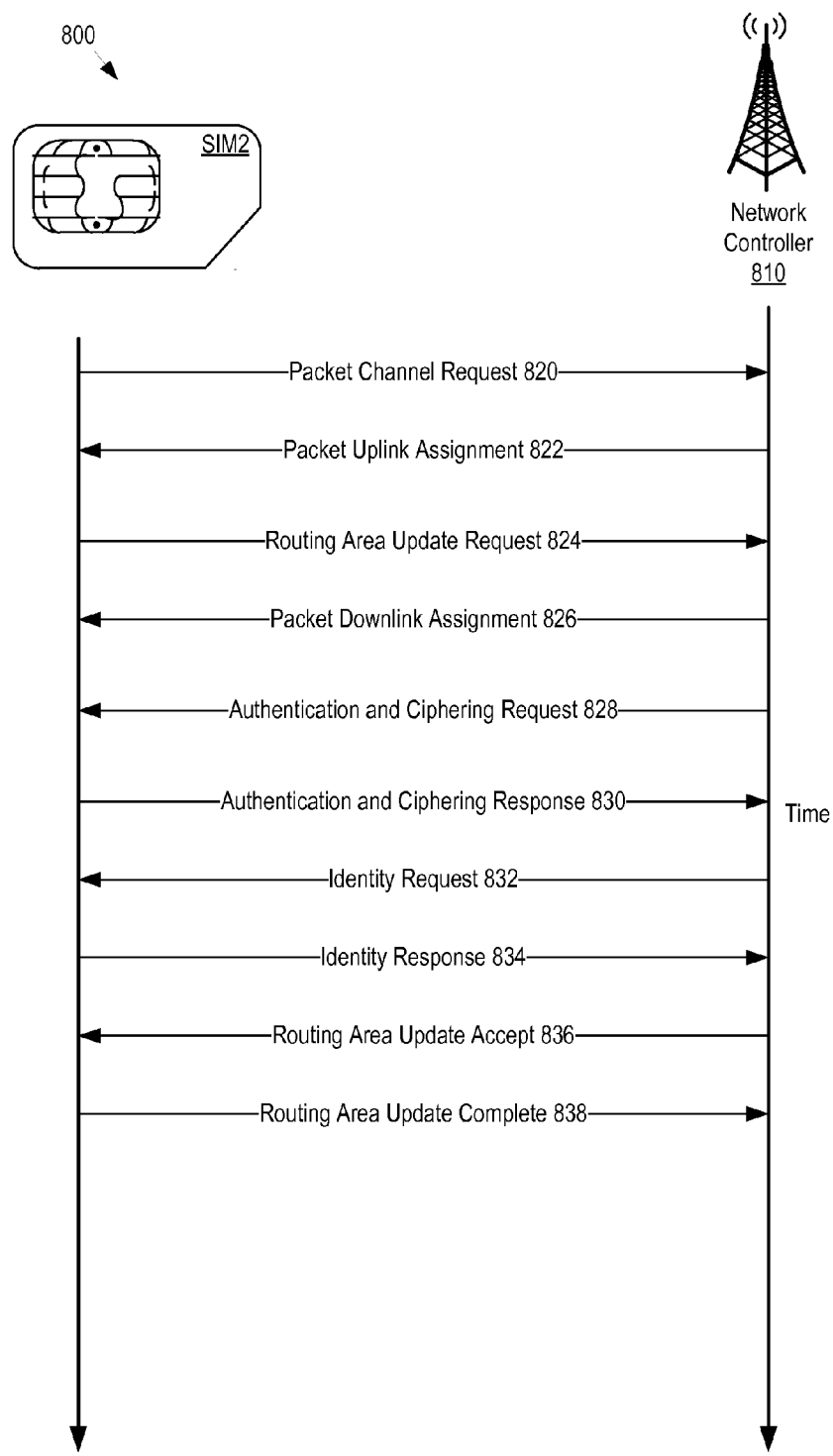
FIG. 8 shows an example of a periodic routing area update.

FIG. 8 shows an example of a periodic routing area update 800. A SIM such as SIM2 104 may perform the periodic routing area update 800 through a series of communications between the user equipment 100 (and specifically SIM2 104) and a network controller 810. Initially, SIM2 104 may transmit a packet channel request message 820 to the network controller 810. The network controller 810 may respond by transmitting a packet uplink assignment message 822 to SIM2 104. Next, SIM2 may transmit a routing area update request message 824, and the network controller 810 may respond by transmitting a packet downlink assignment message 826. Thereafter, the network controller 810 and SIM2 104 may exchange messages relating to authentication and ciphering (e.g., 828 and 830) and identity of the user equipment 100 (e.g., 832 and 834). The network controller 810 may then transmit a routing area update accept message 836. SIM2 104 may then transmit a routing area update complete message 838 to the network controller 810, which may complete the periodic routing area update.

Figure 9:
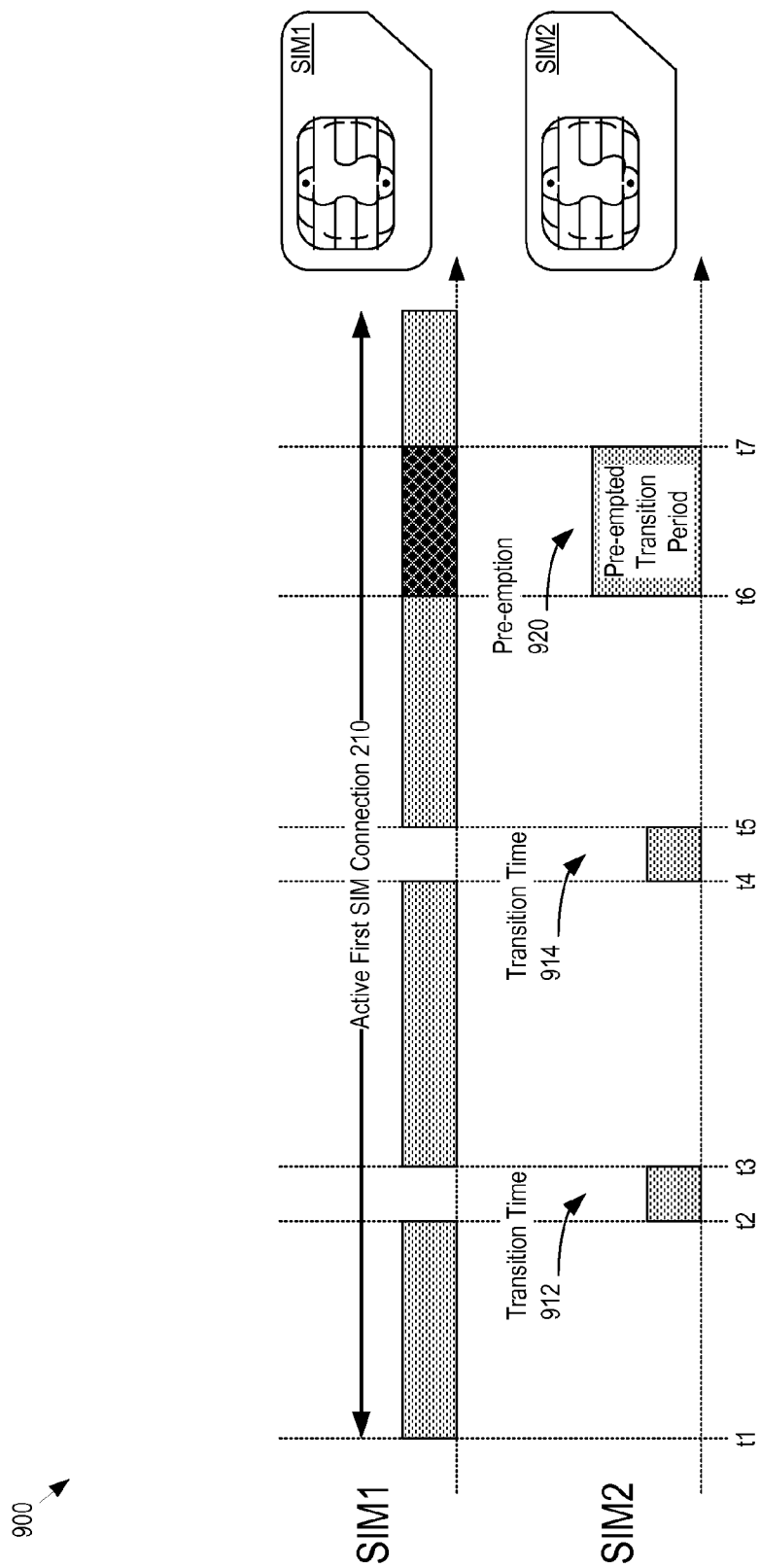
FIG. 9 shows a timing example of background paging monitoring preemption.

FIG. 9 shows a timing example 900 of background paging monitoring preemption. In the timing example 900, SIM1 102 may perform a PS call or a CS call during an active first SIM connection 210. During the active first SIM connection 210, the system logic 114 may identify paging transition times, such as the paging transition time 912 and the paging transition time 914, during which the user equipment 100 may transition the communication interface 100 to SIM2 104 to perform background paging monitoring activity. As shown in FIG. 9, SIM2 may monitor a paging channel or receive a paging indicator from the paging transition time 912 between t2 and t3 and from the paging transition time 914 between t4 and t5.

The system logic 114 may identify a specific time period during the active first SIM connection 210 when the first SIM may execute a high priority communication, such as from time t6 to t7 in the timing example 900. During this time, shown as the preempt period 920, the system logic 114 may preempt transitioning the communication interface 112 to SIM2 104. For example, when SIM1 102 is active on the communication interface 112 performing a PS call, the system logic 114 may identify times during which SIM1 executes high priority communications. The system logic 114 may categorize communications as high priority in many different ways, such as depending on their effect on the performance or throughput of the SIM1 102 PS call. For example, if SIM1 102 loses the communication interface 112 while in a packet transfer mode with a network controller or when transmitting important uplink control messages, the throughput, quality, or other characteristic of the SIM1 102 PS call may be reduced below a predetermined threshold. In such cases, the system logic 114 may inhibit interruption of the SIM1 connection. Uplink messages transmitted by SIM1 102 to a network controller may include transmitting a radio link message, an access control message, a packet uplink acknowledgement message, a transmission control protocol (TCP) acknowledgement message, or a packet downlink acknowledgement message. The system logic 114 may identify these times as preemption periods during which to inhibit SIM2 access (e.g., the preempt period 920).

As an example, the system logic 114 may identify a paging transition time at a time between t6 and t7. The system logic 114 may also identify that SIM1 102 is scheduled to transmit an important uplink control message to a network controller from t6 to t7, a period of time which the system logic 114 may identify as the preempt period 920. Because the paging transition time occurs during the preempt period 920, the system logic 114 may preempt transitioning the communication interface 112 to SIM2 104 to perform background paging monitoring activity during the preempt period 920.

Figure 10:
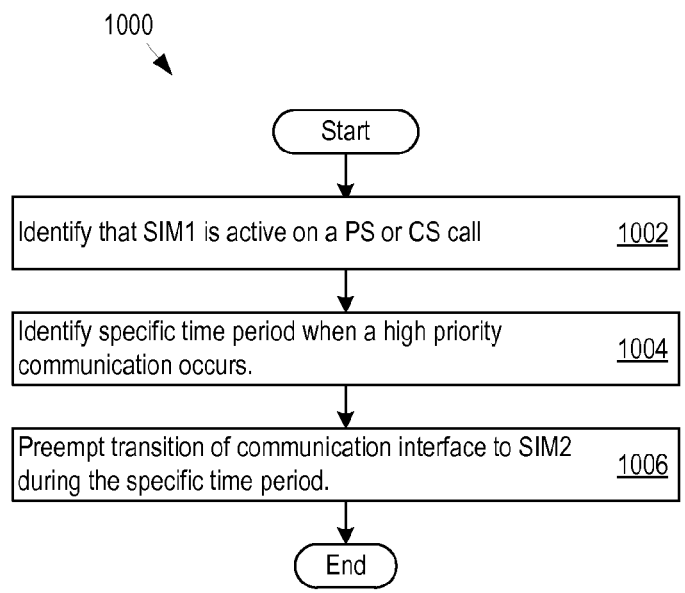
FIG. 10 shows an example of controller logic that the system logic may implement in hardware, software, or both.

FIG. 10 shows an example of controller logic 1000 that that the system logic 114 may implement in hardware, software, or both. For example, the controller logic 1000 may be implemented in software as the controller instructions 122. The controller logic 1000 may identify that SIM1 is active on the communication interface 110 transferring packets in a PS call (1002). During this active first SIM connection 210, the controller logic 1000 may identify a specific time period when SIM1 102 will execute a high priority communication (1004), such as the examples discussed above for a PS call. During the specific time period (e.g., the preempt period 920), the controller logic 1000 may preempt transitioning the communication interface 112 to the second SIM2 104 (1006), for example for SIM2 104 to perform background paging monitoring activity.

In one implementation, the controller logic 1000 may prioritize a SIM2 104 periodic registration update by transitioning the communication interface 112 to SIM2 104 during a preempt period so that SIM2 104 may perform a periodic registration update. Alternatively, the controller logic may also preempt transitioning the communication interface 112 to SIM2 104 to perform a periodic registration update during a preempt period.

Figure 11:
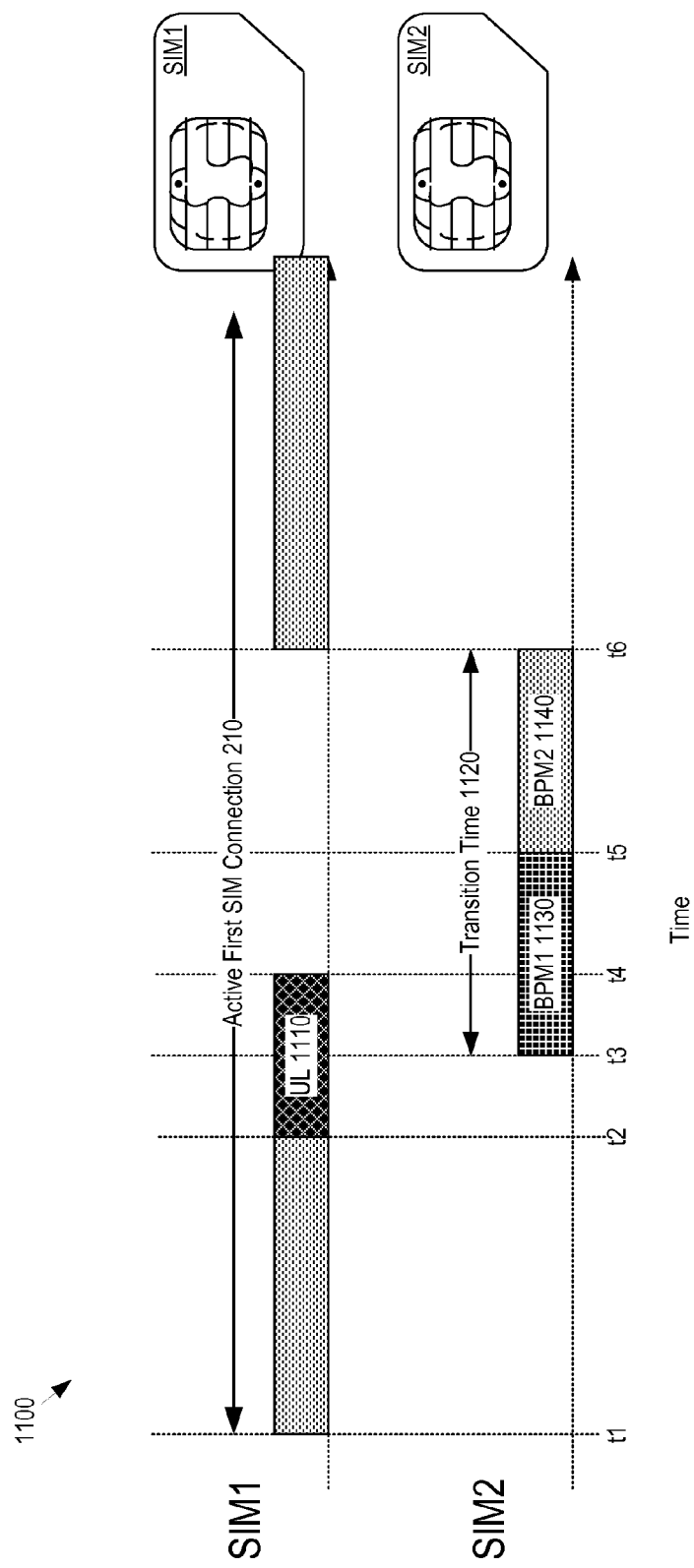
FIG. 11 shows a timing example for enhancing user equipment throughput.

FIG. 11 shows a timing example 1100 for enhancing user equipment 100 throughput. In the timing example 1100, SIM1 102 is active on the communication interface 112 during the active first SIM connection 210. SIM1 102 may perform a PS call or a CS call, or any other type of communication with the network, during the active first SIM connection 210. During a SIM1 102 PS call during the active first SIM connection 210, SIM1 102 may schedule execution of high priority communications, such as the high priority uplink communication 1110, from time t2 to t4. The system logic 114 may identify a high priority access time during the active first SIM connection 210 when SIM1 102 will execute the high priority communication. The system logic 114 may also determine that an idle SIM, e.g., SIM2 104 would be granted access to the communication interface 112 during at least part of the high priority access time, thereby creating a timing conflict for the high priority communication. For example, the system logic 114 may identify a paging transition time 1120 between time t3 to t4 to transition the communication interface 112 to SIM2 to perform background paging monitoring activity, or any other desired communication with the network.

The background paging monitoring (BPM) activity shown in FIG. 11 may include a normal priority BPM action 1130 and a high priority BPM action 1140. The normal priority BPM action 1130 may include background paging monitoring actions that are not time sensitive, such as a multi-path search action or a neighbor cell search action. The high priority BPM action 1140 may include time-sensitive background paging monitoring actions, such as monitoring a paging indicator channel, monitoring a paging channel, or decoding a page.

Figure 12:
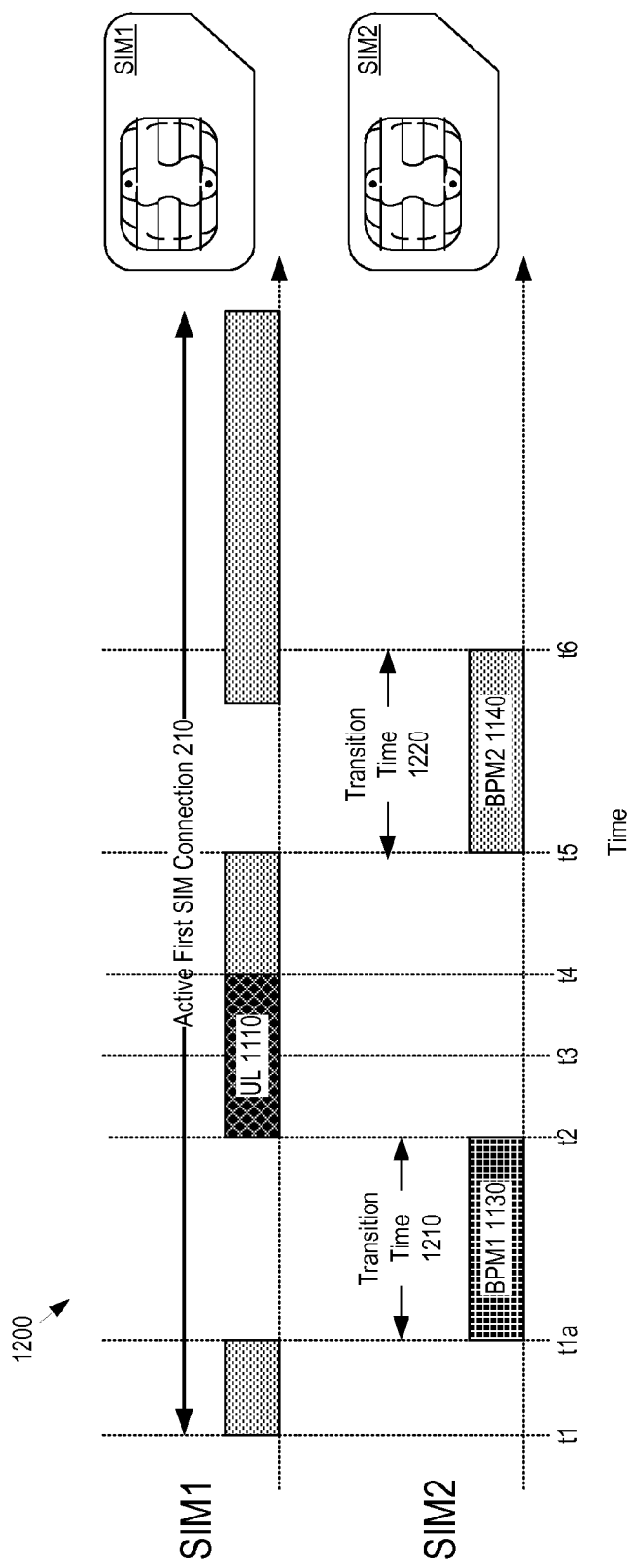
FIG. 12 shows a timing example for enhancing user equipment throughput.

A timing conflict (or alternatively phrased, an access conflict) may exist from time t3 to t4 between performing a high priority communication of SIM1 102 and performing background paging monitoring activity of SIM2 104. The system logic 114 may execute a conflict resolution action that resolves the timing conflict, for example, without interrupting the high priority communication during the high priority access time. As one example of a conflict resolution action, the system logic 114 may reschedule a selected portion of the BPM activity so execution of the high priority communication does not overlap with execution of the BPM activity. In FIG. 12, the system logic 114 has rescheduled the normal priority BPM actions 1130 to an earlier time to resolve the timing conflict without interrupting the high priority communication during the high priority access time. Additionally or alternatively, the system logic 114 may execute the conflict resolution action by rescheduling the conflicting high priority communication, e.g., the high priority uplink communication 1110, to resolve the timing conflict. In some implementations, the system logic 114 may constrain rescheduling to the extent that the rescheduling of the high priority uplink communication 1110 does not affect the throughput or some other characteristic of the SIM1 102 PS call by more than a predetermined threshold.

Further, if scheduling the high priority uplink communication 1110 conflicts with the high priority BPM action 1140, then the system logic 114 may also reschedule the high priority uplink communication 1110, to the extent the rescheduling of the high priority uplink communication 1110 does not affect the throughput of the SIM1 102 PS call. However, if the high priority uplink communication 1110 cannot be rescheduled, the system logic 114 may determine whether the communication interface 112 should be assigned to SIM1 to execute the high priority communication 1110 or to SIM2 to perform the high priority action 1140.

FIG. 12 shows a timing example 1200 for enhancing user equipment 100 throughput. The timing example 1200 follows from the timing example 1100 and depicts the timing of when the normal priority BPM action 1130 has been rescheduled to avoid the timing conflict with executing the high priority uplink communication 1110. Accordingly, the system logic 114 may resolve the previous timing conflict from time t3 to t4 by rescheduling the normal priority BPM action 1130 to begin at a time t1a and conclude at time t2.

As a result of the rescheduling, the system logic 114 may now identify two paging transition times to perform the SIM2 104 background paging monitoring activity. At time t1a, the system logic 114 may identify the paging transition time 1130 to perform the normal priority BPM action. At time t5, the system logic 114 may identify the paging transition time 1140 to perform the high priority BPM action 1140. As seen from FIG. 12, the active first SIM connection 210 is interrupted twice—from time t1a to t2 and from time t5 to t6—in order for SIM2 to perform background paging monitoring activity. The system logic 114 may reschedule the normal priority BPM action 1130 to minimize the time between performing the normal priority BPM action 1130 and the high priority action 1140.

Figure 13:
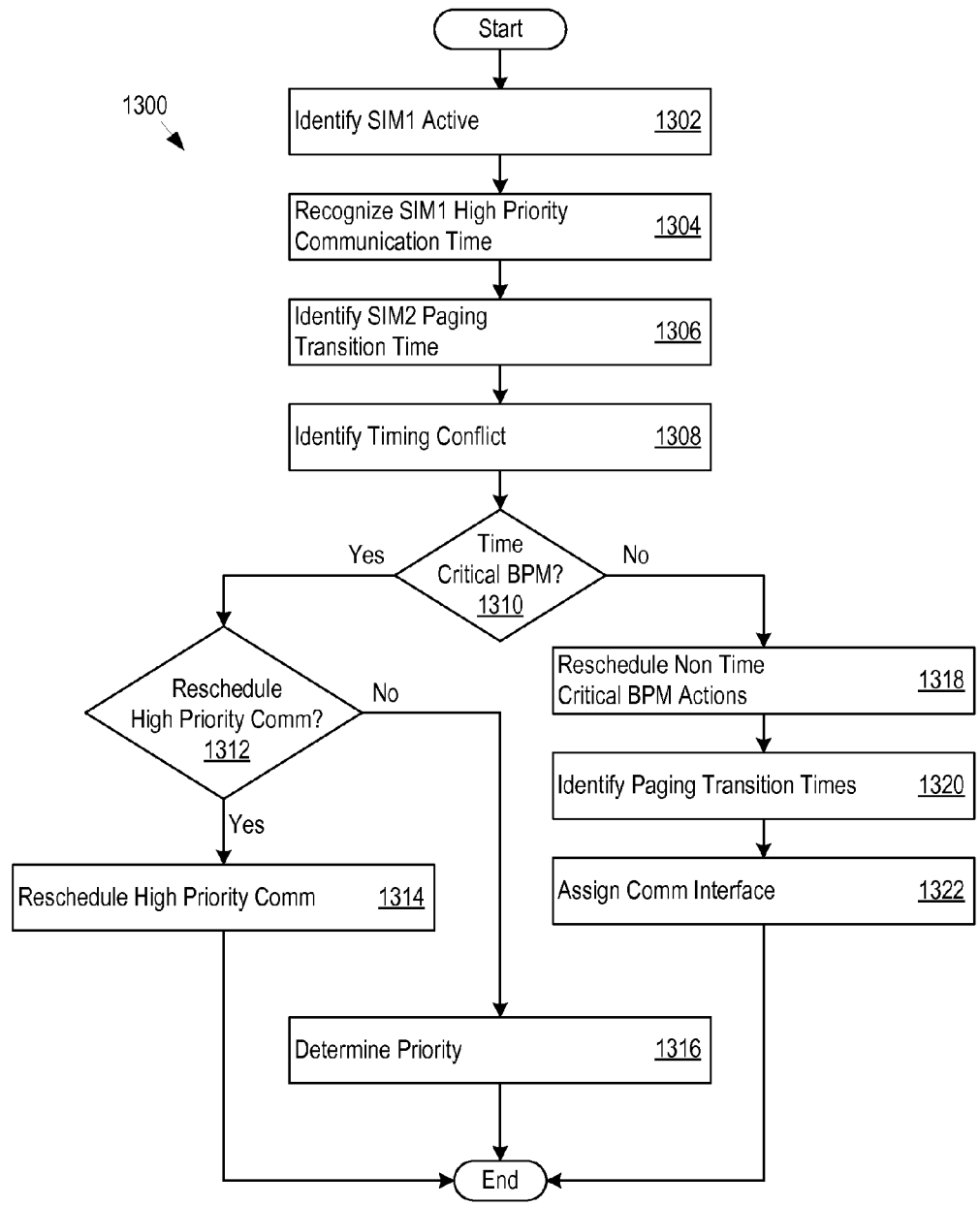
FIG. 13 shows an example of controller logic that the system logic may implement in hardware, software, or both.

FIG. 13 shows an example of controller logic 1300 that that the system logic 114 may implement in hardware, software, or both. For example, the controller logic 1300 may be implemented in software as the controller instructions 122. The controller logic 1300 may identify that SIM1 is active on the communication interface 112 during an active first SIM connection 210 (1302). The controller logic 1300 may then recognize that SIM1 is scheduled to execute a high priority communication at a specific time period (1304). The controller logic 1300 may also identify a paging transition time to transition the communication interface 112 to SIM2 104 to perform background paging monitoring activity (1306). The controller logic 1300 may then identify that a timing conflict exists between SIM1 executing the high priority communication and SIM2 performing background paging monitoring activity (1308).

The controller logic 1300 may determine whether the high priority communication conflicts with performing one or more high priority BPM actions (1310). If the timing conflict involves a high priority BPM action, the controller logic 1300 may determine if rescheduling the high priority communication is possible (1312). If so, the controller logic 1300 may reschedule the high priority communication (1314). As one example, the controller logic 1300 may delay executing an uplink acknowledgement message to the extent the network timing requirements allow for the delay and throughput of the SIM1 102 PS call is not significantly decreased. If not, the controller logic 1300 may determine whether executing the SIM1 102 high priority communication or performing the SIM2 high priority BPM action takes priority, and assigning the communication interface 112 accordingly (1316).

If the timing conflict does not involve high priority BPM actions, then the controller logic 1300 may reschedule the normal priority BPM actions to resolve the timing conflict with execution of the SIM1 high priority communication (1318). The controller logic 1300 may then identify a paging transition time for the rescheduled normal priority BPM actions as well as the high priority BPM actions (1320). The controller logic 1300 may transition the communication interface 112 to support execute the SIM1 102 high priority communication and performing the SIM2 104 BPM activity (1322).

Figure 14:
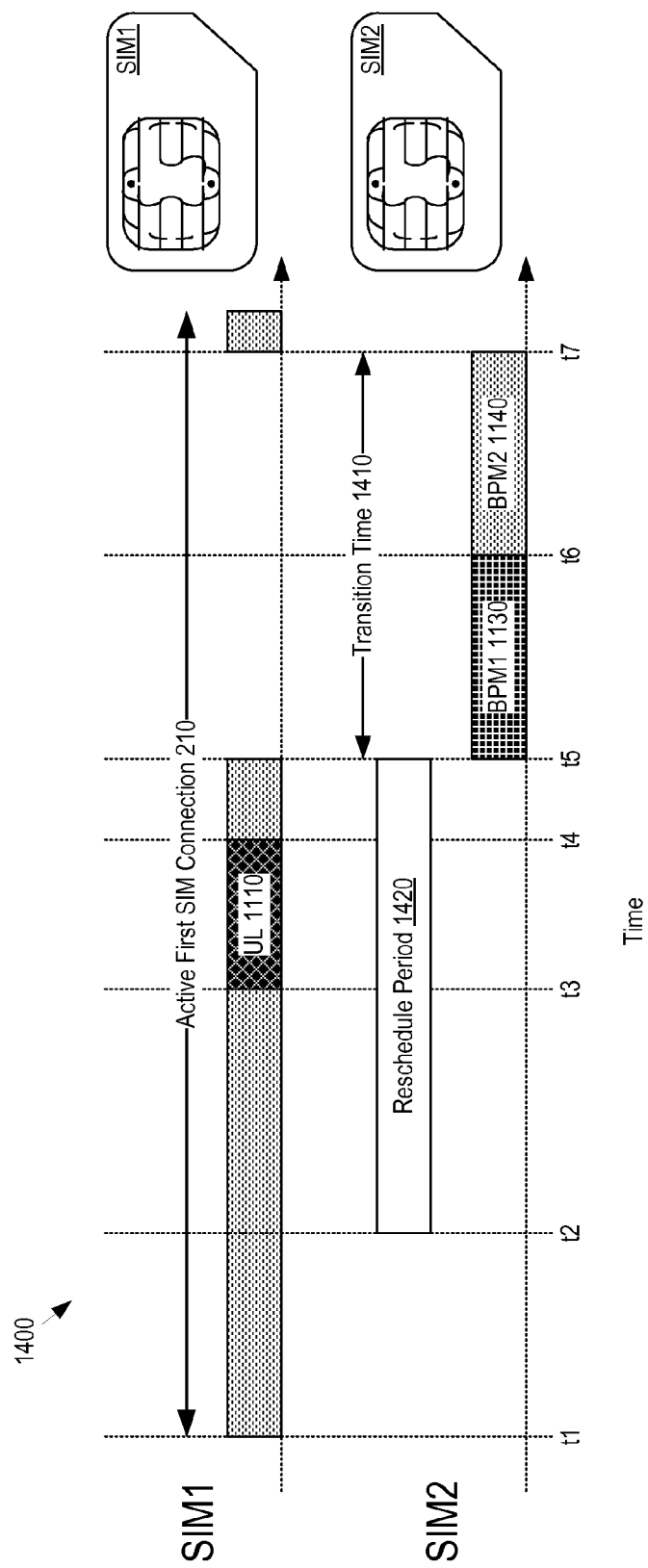
FIG. 14 shows a timing example for enhancing user equipment throughput.

FIG. 14 shows a timing example 1400 for enhancing user equipment 100 throughput. In the timing example 1400, SIM1 102 may be active on the communication interface 112 during the active first SIM connection 210. During the active first SIM connection 210, SIM1 may be scheduled to execute a high priority uplink communication 1110 from time t3 to t4. During the active first SIM connection 210, the system logic 114 may identify the paging transition time 140 at time t5 to transition the communication interface 112 to SIM2 to perform BPM activity, including the normal priority BPM action 1140 and the high priority BPM action 1130, as described in FIG. 11.

To avoid any potential timing conflicts with SIM1 102 high priority communications, the system logic 114 may reschedule the normal priority BPM action 1130 to ensure SIM2 104 performing the normal priority BPM action 1130 does not conflict with SIM1 102 executing a high priority communication, such as the high priority uplink communication 1110. To that end, the system logic 114 may attempt to reschedule the normal priority BPM action 1130 during a reschedule period. A reschedule period may be a predetermined length of time before a scheduled execution time of a BPM action, such as the reschedule period 1420 shown in FIG. 14 from time t2 to t5. The system logic 114 may determine if the normal priority BPM action 1130 can be rescheduled to a time period in the reschedule period 1420 (e.g., time t2) without conflicting with execution of a SIM1 102 high priority communication. In that sense, the system logic 114 employs an opportunistic rescheduling algorithm by rescheduling the normal priority BPM action 1130 at the earliest point in the reschedule period such that the normal priority BPM action 1130 does not conflict with execution of a SIM1 102 high priority communication. For example, the system logic 114 may reschedule the normal priority BPM action 11300 to the earliest time period in the rescheduling period 1420 that does not conflict with a high priority communication such as the high priority uplink communication 1110.

The reschedule period may be a predetermined length of time used when the system logic 114 reschedules BPM actions, e.g., normal priority BPM actions. The length of the reschedule period may be limited so that the normal priority BPM action 1130 and the high priority BPM action 1140 are not executed too far apart in time. For example, the normal priority BPM action 1130 may include a multi-path search action or a neighbor cell search action. The greater the time between performing the normal priority BPM action 1130 and the high priority BPM action 1140, the less effective the timing information gathered from the multi-path search or the neighbor cell search.

However, even if the normal priority BPM action 1130 is rescheduled as described above, the high priority BPM action 1140 may still conflict with the high priority uplink communication 1110. In that case, the system logic 114 may reschedule the high priority uplink communication 1110 if possible or determine whether the high priority uplink communication 1110 or the high priority BPM action 1140 takes priority.

Figure 15:
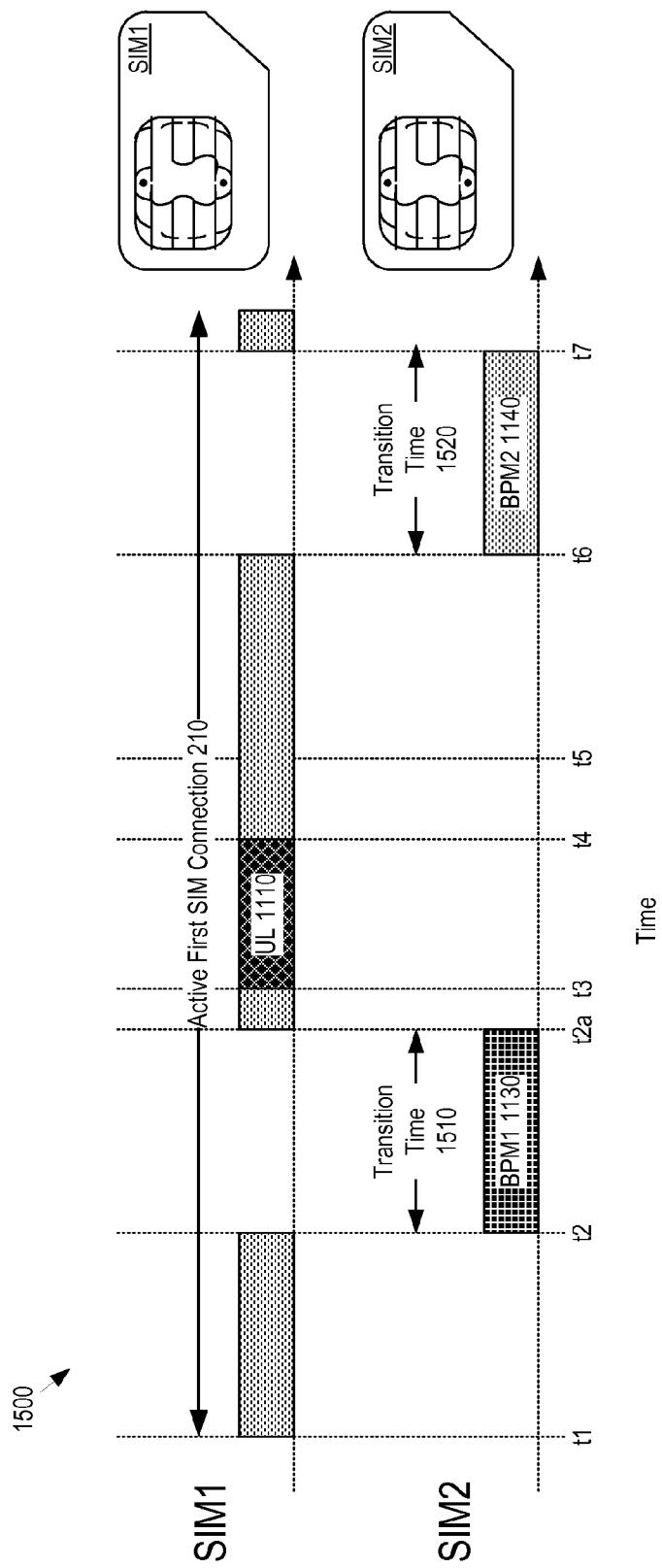
FIG. 15 shows a timing example for enhancing user equipment throughput.

FIG. 15 shows a timing example 1500 for enhancing user equipment 100 throughput. The timing example 1500 follows from the timing example 1400 and depicts the timing of when the normal priority BPM action 1130 has been rescheduled in an opportunistic manner to begin at time t2 instead of t5 as in the timing example 1400. Further, the system logic 114 may reschedule normal priority BPM action 1130 without regard as to whether the normal priority BPM action 1130 would have conflicted with the high priority uplink communication 1110.

Once the normal priority BPM action 1130 has been rescheduled, the system logic 114 may identify a paging transition time for both the normal priority BPM action 1130 and the high priority BPM action 1140. In the timing example 1500, the system logic 114 has identified the paging transition time 1510 at time t2 to perform the normal priority BPM action 1130. The system logic 114 has also identified the paging transition time 1520 to perform the high priority BPM action 1140.

Figure 16:
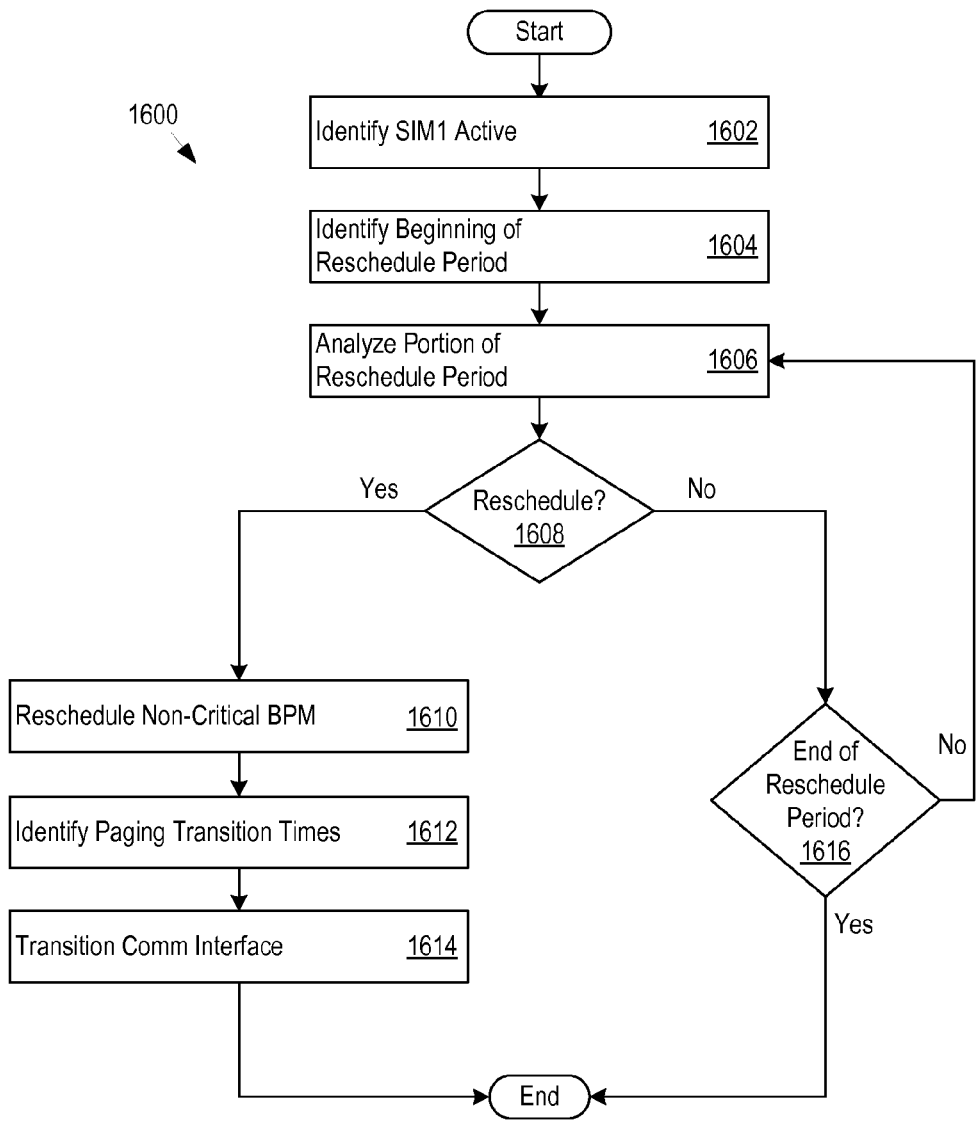
FIG. 16 shows an example of controller logic that the system logic may implement in hardware, software, or both.

FIG. 16 shows an example of controller logic 1600 that that the system logic 114 may implement in hardware, software, or both. The controller logic 1600 may be implemented in software as the controller instructions 122. The controller logic 1600 may first identify that SIM1 is active on the communication interface 112 during an active first SIM connection 210 (1602). Next, the controller logic 1600 may identify when a reschedule period begins (1604). That is, the controller logic 1600 may recognize that a certain time before SIM2 104 BPM activity is scheduled, where the certain time may be specified by a predetermined value, thus marking the beginning of the of the reschedule period.

Next, the controller logic 1600 may analyze the scheduled packet transmission for communication across the communication interface 112 (1606), for example for an examination period of the next two 10 ms frames. Alternatively, the controller logic 1600 may analyze the scheduled packet transmission for an examination period of the next four 10 ms frames. The controller logic 1600 may determine whether a SIM2 104 normal priority BPM action may be rescheduled within the examination period and avoid a time conflict with executing a SIM1 102 high priority communication (1608), starting from the earliest point in the examination period.

If so, the controller logic 1600 may reschedule the normal priority BPM action to the earliest identified point in time (1610). The controller logic 1600 may then identify paging transition times for the rescheduled normal priority BPM action and the high priority action (1612). Next, the controller logic 1600 may transition the communication interface 112 to SIM2 according to the identified paging transition times (1614) to allow SIM2 to perform background paging monitoring activity during the active first SIM connection 210.

If the controller logic 1600 cannot reschedule the normal priority BPM action during the examination period (e.g., due to a timing conflict with a SIM1 102 high priority communication), the controller logic 1600 may determine if the entire rescheduling period has been considered (1616). If so, the controller logic 1600 may be unable to reschedule the normal priority BPM action. If not, the controller logic 1600 may analyze the next portion of the rescheduling period (1606).

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system comprising:
    a communication interface;
    controller logic in communication with the communication interface, the controller logic operable to:
        obtain registration timing information for a first subscriber identity module (SIM) from a network controller that supports the first SIM;
        identify, based on the registration timing information of the first SIM, a transition time that occurs during an active second SIM connection to transition the communication interface to the first SIM to perform a selected communication with the network controller; and
        selectively transition the communication interface to the first SIM at the transition time.

2. The system of claim 1, where:
    the selected communication comprises a registration update with the network controller.

3. The system of claim 1, where:
    the selected communication comprises a periodic location update, a periodic routing update, periodic tracking update, or any combination thereof.

4. The system of claim 1, where the controller logic is operable to identify the transition time by:
    configuring a registration timer based on the registration timing information of the network controller.

5. The system of claim 4, where the controller logic is further operable to identify the transition time by:
    setting the transition time as an expiration time of the registration timer.

6. The system of claim 1, where the controller logic is operable to identify the transition time by:
    receiving a request for use of the communication interface by the first SIM to perform the selected communication.

7. The system of claim 1, where the controller logic is operable to selectively transition the communication interface by transitioning the communication interface to the first SIM when the active second SIM connection comprises a data packet connection and foregoing transitioning the communication interface to the first SIM when the active second SIM connection comprises a voice call connection.

8. A system comprising:
    a communication interface;
    controller logic in communication with the communication interface, the controller logic operable to:
        identify a update transition time that occurs during an active first SIM connection, to transition the communication interface to a second SIM to perform a registration update communication with a network controller that supports the second SIM; and
        when the active first SIM connection comprises a voice call connection:
            maintain the active first SIM connection instead of transitioning the communication interface to the second SIM; and
        when the active first SIM connection comprises a data packet connection:
            transition the communication interface to the second SIM at the update transition time.

9. The system of claim 8, where the registration update communication comprises a periodic location update, a periodic routing update, periodic tracking update, or any combination thereof.

10. The system of claim 8, where the controller logic is operable to identify the update transition time by:
    obtaining registration timing information from the network controller.

11. The system of claim 10, where the registration timing information comprises a frequency for performing the registration update communication to maintain a network connection.

12. The system of claim 10, where the controller logic is further operable to identify the update transition time by:
　configuring a registration timer based on the registration timing information of the network controller; and
　setting the update transition time as an expiration time of the registration timer.

13. The system of claim 8, where the controller logic is operable to identify the update transition time by:
　receiving a request for use of the communication interface by the second SIM to perform the registration update communication.

14. A system comprising:
　a communication interface;
　controller logic in communication with the communication interface, the controller logic operable to:
　　identify a transition time that occurs during an active first SIM connection, to transition the communication interface to a second SIM to perform a registration update communication with a network controller that supports the second SIM;
　　start a guard timer at the transition time;
　　transition the communication interface to the second SIM at the transition time; and
　　when the guard timer expires or when the second SIM completes the registration update communication:
　　　transition the communication interface back to the first SIM.

15. The system of claim 14, where the registration update communication comprises a periodic location update, a periodic routing update, periodic tracking update, or any combination thereof.

16. The system of claim 14, where the controller logic is operable to identify the transition time by:
　obtaining registration timing information from the network controller.

17. The system of claim 16, where the periodic registration timing information comprises a frequency for performing a registration update communication to maintain a network connection.

18. The system of claim 16, where the controller logic is further operable to identify the transition time by:
　configuring a registration timer based on the registration timing information of the network controller; and
　setting the transition time as an expiration time of the registration timer.

19. The system of claim 18, where the controller logic is operable to configure the registration timer to expire in sufficient time for the second SIM to perform the registration update communication to maintain a network connection.

20. The system of claim 14, where the controller logic is operable to identify the transition time by:
　receiving a request for use of the communication interface by the second SIM to perform the registration update communication.

\* \* \* \* \*